United States Patent [19]

Niemann et al.

[11] Patent Number: 4,512,957
[45] Date of Patent: Apr. 23, 1985

[54] METHOD FOR THE SEPARATION OF URANIUM ISOTOPE COMPOUNDS ALREADY CONVERTED ISOTOPE-SELECTIVELY

[75] Inventors: Hans-Joachim Niemann; Josef Sprehe, both of Erlangen, Fed. Rep. of Germany

[73] Assignee: Kraftwerk Union Aktiengesellschaft, Mülheim, Fed. Rep. of Germany

[21] Appl. No.: 313,617

[22] Filed: Oct. 21, 1981

Related U.S. Application Data

[63] Continuation of Ser. No. 92,643, Nov. 8, 1979, abandoned.

[30] Foreign Application Priority Data

Nov. 22, 1978 [DE] Fed. Rep. of Germany ....... 2850648

[51] Int. Cl.$^3$ .................. B01D 59/00; C01G 43/06
[52] U.S. Cl. ............................................ 423/3; 55/17
[58] Field of Search .................... 55/17; 423/19, 3

[56] References Cited

U.S. PATENT DOCUMENTS 3,465,500  9/1969  Fenn ......................................... 55/17
4,286,153  8/1981  Janner et al. ........................... 423/19

Primary Examiner—Deborah L. Kyle
Assistant Examiner—Virginia B. Caress
Attorney, Agent, or Firm—Herbert L. Lerner; Laurence A. Greenberg

[57] ABSTRACT

Separation of heavier uranium isotope compounds from lighter uranium isotope compounds in a gas jet having supersonic velocity after one isotope is converted selectively by laser radiation. The gas jet is subjected to an oblique compression shock to abruptly change direction causing the lighter isotope compounds to be deflected unrestrained by guiding walls with the heavier isotope compounds continuing on substantially in the original direction of the gas jet. The heavier isotope compounds are collected in a collecting vessel.

1 Claim, 1 Drawing Figure

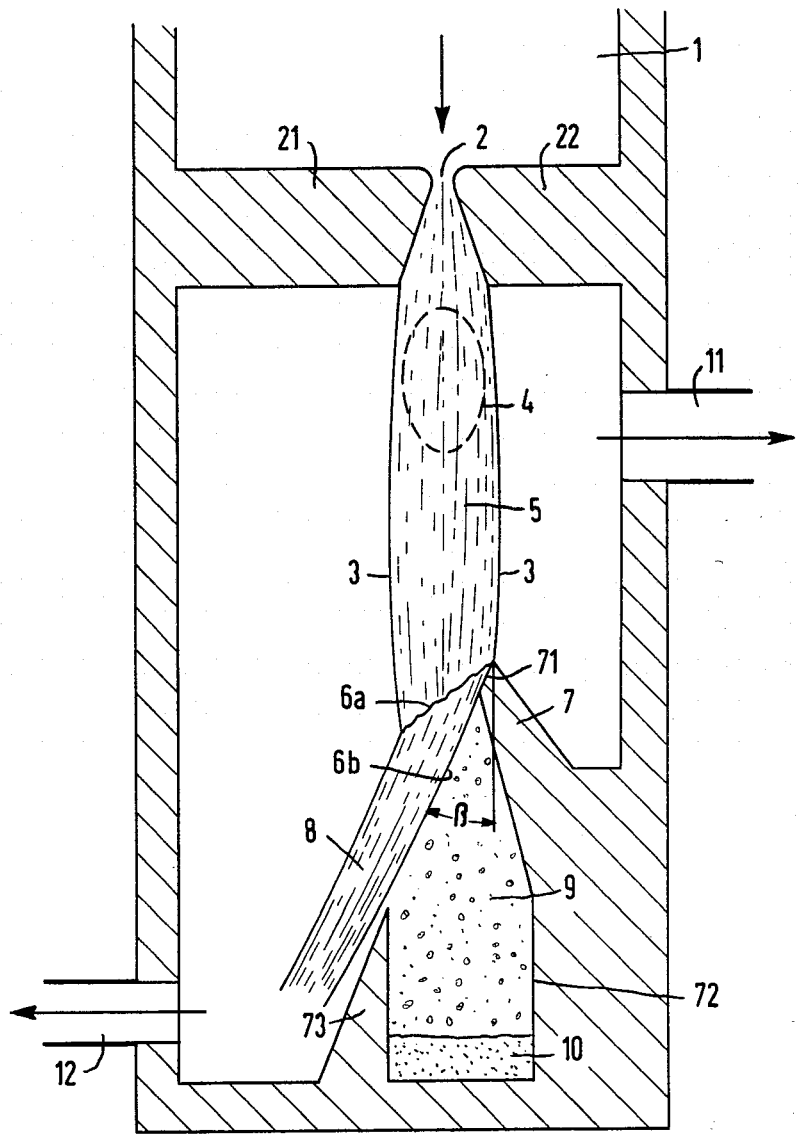

METHOD FOR THE SEPARATION OF URANIUM ISOTOPE COMPOUNDS ALREADY CONVERTED ISOTOPE-SELECTIVELY

This is a continuation of application Ser. No. 092,643, filed Nov. 8, 1979 now abandoned.

BACKGROUND OF THE INVENTION

1. Field of the Invention

The present invention relates to a method for the separation of uranium isotope compounds in which one isotope has been selectively converted by means of laser radiation within a gas jet having supersonic velocity.

2. Description of the Prior Art

A large number of isotope separation methods have already been proposed, in which the so-called isotope shift in the spectra of the uranium compounds was utilized for the isotope-specific excitation through irradiation with narrow-band laser radiation. In this connection, reference is made to German Published Non-Prosecuted Patent Application No. 2 447 762 (corresponding U.S. application Ser. No. 612,213) as well as German Application No. P 26 59 590 (corresponding U.S. application Ser. No. 862,504). There, adiabatic expansion of the gaseous isotope mixture is proposed whereby supersonic velocity is achieved and cooling to temperatures of about 30 to 50 K. is effected in the process. By means of this measure it is possible to cover the Q-branch of the $V_3$-band in the spectrum of the $UF_6$ of the one uranium isotope practically without influencing the other. The excitation obtainable in this manner of only the one isotope compound makes it possible, for instance, to chemically react the same with a simultaneously introduced reaction partner, so that therefore a reaction product, for instance, $UF_5$, a solid substance, is formed. These reaction products which initially have the nature of aerosole, agglomerate and thus form particles of larger mass than that of the molecules which do not participate in the reaction.

From the so-called separation-nozzle method it is known to utilize for the isotope separation the mass difference between uranium 235 and uranium 238, in the compound $UF_6$. The gas flow is conducted in nozzle-like canals and is deflected therein, so that under the influence of the centrifugal force or the mass inertia, a redistribution of the uranium isotope molecules of different specific gravity takes place. The gas jet depleted of the desired uranium isotope is collected separately from the correspondingly enriched gas jet by means of a mechanical peeler.

In view of the very small mass differences, the efficiency of such a separating stage is very low, so that a large number of such separating stages must be connected in series to achieve the enrichment to 3% uranium 235 required for light-water reactors.

The degree of enrichment obtainable by isotope-specific laser excitation is substantially higher and under some conditions yields the desired enrichment in one stage. However, it is important there to separate the reaction products enriched, for instance, with uranium 235, rapidly from the remaining gas flow, as the selectivity of this method could be reduced by fluorine exchange between reaction products, i.e., $UF_5$ and $UF_6$. Utilizing the centrifual forces by means of flow deflection has been proposed already in Patent Application No. P 26 59 590 and corresponding U.S. application Ser. No. 862,504; the flow canal was confined there by solid walls. However, this method can bring with it difficulties of an equipment nature, since the confining walls must be suitable for the temperature of the gas jet and, under some conditions, additional measures for influencing the boundary layers become necessary.

SUMMARY OF THE INVENTION

An object of the present invention is to provide a method and apparatus for separating the particles of different mass contained in a gas flow having supersonic velocity, in which solid walls for deflecting the gas flow are obviated and which can be implemented with substantially simpler apparatus.

With the foregoing and other objects in view, there is provided in accordance with the invention a method for the separation of uranium compounds in which one isotope is converted selectively by laser radiation within a gas jet of the uranium compounds having supersonic velocity, which comprises subjecting the resultant gas jet free of restraining walls and containing heavier converted isotope compounds and lighter non-activated isotope compounds to an oblique compression shock to abruptly change the direction of the gas causing the lighter isotope compound to be deflected without guiding walls and with the heavier isotope compounds continuing on substantially in the original direction of the gas jet, and collecting the heavier isotope compounds in a collecting vessel.

In accordance with the invention there is provided an apparatus for the separation of uranium compounds which comprises, a supply chamber containing the gaseous uranium compounds to be separated, a second reaction chamber, a slit nozzle through which the gaseous uranium compounds flow from the supply chamber and discharge as a gas jet having supersonic velocity into the second reaction chamber, laser beam means to traverse a zone of the gas jet to effect selective conversion of one isotope with the resultant gas jet containing heavier converted isotope compounds and lighter non-activated isotope compounds, a rigid narrow surface which forms an acute angle with the gas jet disposed in the path of the gas jet in the edge region of the gas jet downstream of the irradiation as the upper edge of a collecting vessel extending in the direction of the gas jet, and an opposite lower edge of the collecting vessel disposed downstream of the upper edge as a peeling-off edge and confining edge for the gas jet which is deflected without guiding walls.

Other features which are considered as characteristic for the invention are set forth in the appended claims.

Although the invention is illustrated and described herein as embodied in a method for the separation of uranium isotope compounds already converted isotope-selectively, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus for carrying out the present invention.

DETAILED DESCRIPTION OF THE INVENTION

According to the invention, an oblique compression shock or several compression shocks are generated for changing the direction abruptly of a gas jet having supersonic velocity and containing lighter and heavier isotope compounds, so that the centrifugal or inertial forces obtained thereby move the lighter isotope compounds in the deflected gas jet, but the heavier ones continue substantially in the original direction and are collected in a collecting vessel.

This method will now be explained in further detail with reference to the attached FIGURE which shows schematically apparatus for implementing same.

A supply space or chamber 1 for the gaseous $UF_6$ isotope mixture including reaction partner and possible carrier gas is followed by a nozzle 2 which is defined by the walls 21 and 22. This nozzle 2 is designed as a slit nozzle and has, for instance, a radius of curvature of the inlet of 0.15 mm, a length of 5 mm and an aperture angle of 10°.

In front of this nozzle 2, a laser beam traverses the molecular jet which comes from the nozzle 2 in the manner shown and has supersonic velocity. The penetration zone is shown by dashed lines and designated by numeral 4. In the region 5 behind, i.e. downstream, this irradiation zone 4, the reaction products are formed, such as $UF_5$, which are to be separated by this apparatus. Further downstream in the gas jet, the edge region 3 of the molecular jet strikes a narrow surface 71 at the end of a profiled member 7 which is fastened to the wall of this apparatus and which forms at the same time the upper edge of the collecting vessel 72. This surface 71 has an angle of about 10° to 30° relative to the vertical. The angle $\beta$ formed by the inner wall of profile member 7 and an extension of surface 71 is generally slightly larger than the angle of surface 71 because the inner wall is usually at a slight angle to the vertical.

A compression shock 71 is formed transversely through the molecular flow through the impact of the narrow edge region 3 with this surface 71, followed by further compression shocks which are not shown in the FIGURE and are caused by the impact of the moving gas jet with the stationary gas in the chamber 9. This causes a sudden deflection of the molecular jet into the deflected gas jet 8. The latter flows freely and without confining surfaces and is pumped off separately at 12 as a compressed gas jet in known manner of pressure recovery. In this zone, the other wall of the collecting vessel 72 forms a peeling-off or separating wall 73 between the pumped-off gas stream 12 and the reaction product 10 contained in the collecting vessel 72. Above the latter, there is a stationary gas cushion 9, into which the reaction product 10 flows, following its inertia. It therefore consists of the heavier particles formed in the region 5. The lighter particles which remained in the molecular state, are removed with the deflected gas stream 8. The pressure ratio required for the isotope-selective reactions to come about is set via the suction line 11.

The direction change in the edge region 3 of the molecular jet, forced at the narrow surface 71, causes the compression shock which travels into the jet, and causes a change of direction thereof also at great depth. The intended change of direction of the jet and the angle of the compression shock can be calculated in known manner from the gas-dynamic laws; it depends essentially on the kind of gas and the Mach number of the gas. This deflection of the jet may be amplified in some circumstances, after the compression shock 6a is released, also by oblique shocks 6b which are triggered by the stationary gas 9.

Since, as mentioned at the outset, the presentation of this apparatus is only of a schematic nature, other possible designs which cause the development of a deflection of the gas flow without confinement, are also possible, of course.

There are claimed:

1. Method for the separation of $U^{235}F_5$ within a gas jet having supersonic velocity and which gas jet contains a carrier gas, a reaction partner, gaseous $U^{238}F_6$ and condensed $U^{235}F_5$ produced by a preceding laser radiation of the gas jet chemically transforming $U^{235}F_6$ in the jet with the aid of the reaction partner to $U^{235}F_5$, which comprises applying a compression shock to the gas jet which contains the condensed $U^{235}F_5$ by means of a single rigid narrow surface which extends into the edge region of the gas jet and forms an acute angle of 10° to 30° with the direction of the gas jet, said compression shock effecting a deflection of the gaseous $U^{238}F_6$ molecules without essentially deflecting said condensed $U^{235}F_5$, and continuing the condensed $U^{235}F_5$ in the direction of the non-deflected gas jet to a collecting vessel whose opening is bounded at one side by the rigid narrow surface and downstream from the rigid narrow surface at the other side by a peeling-off edge which separates the deflected gas jet from the condensed $U^{235}F_5$.

* * * * *